(12) United States Patent
Crum

(10) Patent No.: US 7,658,812 B2
(45) Date of Patent: Feb. 9, 2010

(54) SYSTEM FOR PRODUCING PRESSURE SENSITIVE INTERMEDIATE WEB ASSEMBLY HAVING REGULARLY OCCURRING DISCONTINUOUS SEGMENTS PRODUCED IN A CONTINUOUS FASHION

(75) Inventor: Jesse D. Crum, Fort Scott, KS (US)

(73) Assignee: Ward/Kraft, Inc., Fort Scott, KS (US)

( * ) Notice: Subject to any disclaimer, the term of this patent is extended or adjusted under 35 U.S.C. 154(b) by 216 days.

(21) Appl. No.: 12/006,866

(22) Filed: Jan. 7, 2008

(65) Prior Publication Data

US 2008/0105369 A1    May 8, 2008

Related U.S. Application Data

(62) Division of application No. 11/166,754, filed on Jun. 24, 2005, now abandoned.

(51) Int. Cl.
*B31D 1/02* (2006.01)
*B32B 38/04* (2006.01)
*B32B 38/14* (2006.01)
*B32B 7/14* (2006.01)

(52) U.S. Cl. ............... 156/248; 156/265; 156/267; 156/277; 156/291

(58) Field of Classification Search ............... 156/257, 156/265, 267, 268, 248, 270, 271, 277, 291, 156/302, 384, 519, 520
See application file for complete search history.

(56) References Cited

U.S. PATENT DOCUMENTS

| | | | | |
|---|---|---|---|---|
| 3,598,685 A * | 8/1971 | Lee et al | ............... | 132/73 |
| 3,609,044 A * | 9/1971 | Murphy | ............... | 356/430 |
| 3,869,328 A * | 3/1975 | Instance | ............... | 156/285 |
| 3,897,053 A * | 7/1975 | Guy | ............... | 271/238 |
| 3,936,567 A * | 2/1976 | Vesely | ............... | 428/325 |
| 4,337,904 A * | 7/1982 | Miller et al. | ............... | 242/421.6 |
| 4,488,922 A * | 12/1984 | Instance | ............... | 156/192 |
| 4,528,055 A * | 7/1985 | Hattemer | ............... | 156/247 |
| 4,591,271 A * | 5/1986 | Byers | ............... | 356/432 |
| 4,664,416 A * | 5/1987 | Steidinger | ............... | 462/2 |
| 4,680,080 A * | 7/1987 | Instance | ............... | 156/357 |
| 4,690,720 A * | 9/1987 | Mack | ............... | 156/248 |
| 4,738,473 A * | 4/1988 | Meloni et al. | ............... | 273/139 |
| 4,787,950 A * | 11/1988 | Meloni et al. | ............... | 156/249 |
| 4,898,375 A * | 2/1990 | Holtje | ............... | 271/246 |
| 5,120,040 A * | 6/1992 | Worley | ............... | 271/9.07 |
| 5,271,787 A * | 12/1993 | Hoffmann et al. | ............... | 156/268 |
| 5,282,649 A * | 2/1994 | Williams et al. | ............... | 283/56 |
| 5,351,426 A * | 10/1994 | Voy et al. | ............... | 40/638 |
| 5,353,701 A * | 10/1994 | Casagrande | ............... | 101/127 |
| 5,427,640 A * | 6/1995 | Daniels | ............... | 156/250 |
| 5,700,536 A * | 12/1997 | Steidinger | ............... | 428/40.1 |
| 6,174,402 B1 * | 1/2001 | Nakano et al. | ............... | 156/253 |

(Continued)

*Primary Examiner*—Philip C Tucker
*Assistant Examiner*—Sing P Chan

(57) ABSTRACT

A continuous manufacturing system is provided for producing an intermediate web assembly having a series of regularly occurring preprinted segments that are disposed on a surface of the web. The segments are initially produced in a sheet form which is prepared by rendering high quality images in discrete areas representative of the portions to be subsequently separated to form the segments. The individual segments are cut from the sheet and then are provided to a placer mechanism that sequentially places the segments individually on the web to create an intermittently laminated web assembly.

2 Claims, 4 Drawing Sheets

U.S. PATENT DOCUMENTS

| | | | |
|---|---|---|---|
| 6,350,342 B1 * | 2/2002 | Steidinger et al. | 156/257 |
| 6,471,817 B1 * | 10/2002 | Emmert | 156/257 |
| 6,562,171 B1 * | 5/2003 | Archie et al. | 156/204 |
| 6,761,792 B2 * | 7/2004 | Franko, Sr. | 156/256 |
| 6,863,756 B2 * | 3/2005 | Nedblake et al. | 156/64 |
| 7,005,094 B2 * | 2/2006 | Jack | 264/129 |
| 2002/0168212 A1 * | 11/2002 | Nedblake et al. | 400/621 |
| 2003/0072889 A1 * | 4/2003 | Abrams | 427/458 |
| 2003/0117481 A1 * | 6/2003 | Kometani et al. | 347/213 |
| 2004/0182928 A1 * | 9/2004 | Ehrhart et al. | 235/454 |
| 2006/0146410 A1 * | 7/2006 | Krause | 359/619 |
| 2006/0260743 A1 * | 11/2006 | Crum | 156/291 |
| 2006/0260753 A1 * | 11/2006 | Crum | 156/387 |
| 2006/0263558 A1 * | 11/2006 | Crum | 428/40.1 |
| 2007/0141291 A1 * | 6/2007 | Buck | 428/42.3 |

* cited by examiner

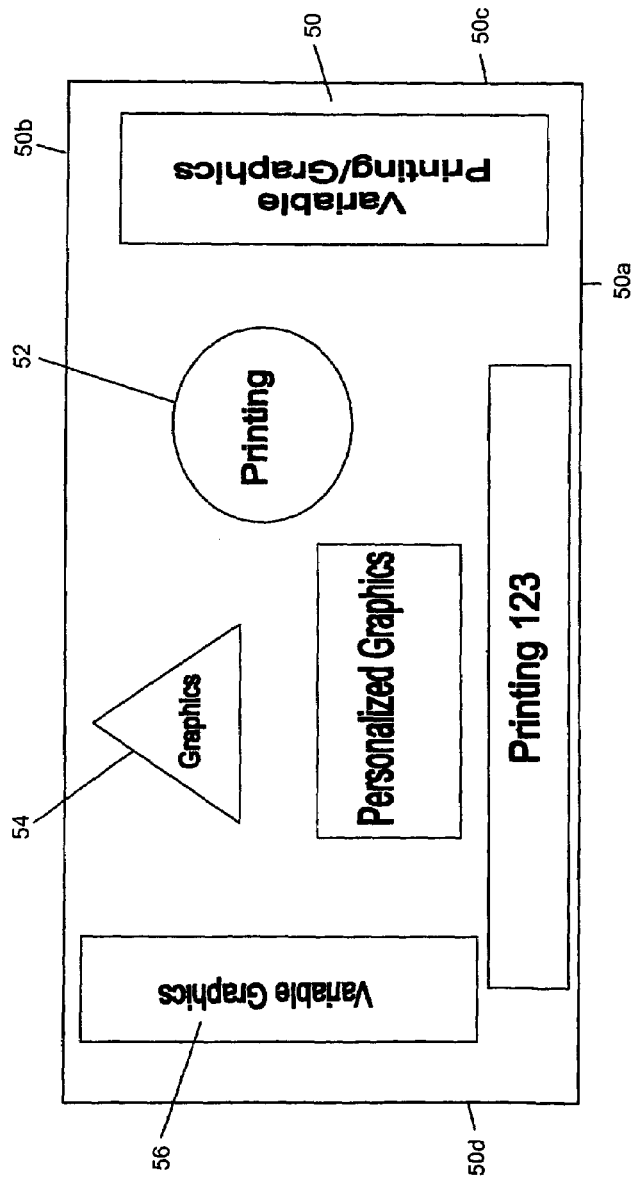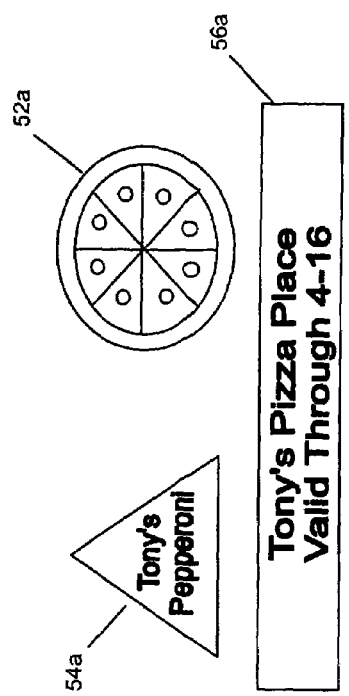

SYSTEM FOR PRODUCING PRESSURE SENSITIVE INTERMEDIATE WEB ASSEMBLY HAVING REGULARLY OCCURRING DISCONTINUOUS SEGMENTS PRODUCED IN A CONTINUOUS FASHION

CROSS-REFERENCES TO RELATED APPLICATIONS

This application is a divisional application of Ser. No. 11/166,754 filed Jun. 24, 2005, now abandoned.

FIELD OF THE INVENTION

The present invention is in the field of continuous manufacturing systems that are used in the production of unique intermediate laminate assemblies. More particularly, the invention is directed to a system that is used in the production of a number of printed sheets with each sheet having predefined discrete areas relating to specific jobs or applications. The sheets are then cut into individual segments, ribbons or strips, with each strip having a pre-printed area pertaining to a specific job. Through the inclusion of a placer mechanism, the segments or ribbons may be placed continuously, individually and directly on a web for processing and ease of handling. The web may then be subjected to additional processing steps to segregate the individual jobs for delivery to the end user customer.

The segments or ribbons, which are intended to represent discrete, individual preprinted areas on the sheet, with each area representing a specific order, can be used for a number of printed communication pieces such as labels, tags, cards, etc. The sheets are produced in part, initially from a pre-imaged or pre-printed sheet that is then converted or merged to a roll type of format through use of a placer mechanism.

The sheets are initially printed with high quality graphics or images that relate to the specific order. The sheets are then slit or cut to size to form templates, ribbons, surface elements or segments for the particular applications or jobs being produced. The segments are then converted to or merged with a continuously advancing web to create a continuous intermediate roll format by placing the individual segments on the web in a sequential fashion. The segments that have been affixed to the web are then provided in one or more intermediate configurations to an end user. More particularly, the present invention can be used to create pressure sensitive laminates that can be further manipulated to produce individual, prime labels, tags, cards, etc. that have a high or photo quality resolution level such as those greater than about 150 lines per inch and still preferably greater than about 300 lines per inch or approximately 2500 to 3500 dots per inch.

BACKGROUND OF THE INVENTION

There are wide varieties of product offerings available in the market today that serve multiple purposes and functions, including product offerings that are used in fulfilling the needs of particular market segments such as in the prime label market and other business communication assemblies that are used to convey or handle information.

Printed products, such as pieces that are intended to be used in business communications, can be delivered in a wide variety of formats, constructions and configurations. Normally, one of the most significant limiting factors for a manufacturer being able to produce a particular construction or expand product capabilities is the equipment the manufacturer has on hand to generate such printed pieces.

Traditional manufacturers of business communications, such as business forms and labels, are also usually limited in the type of jobs that a manufacturer will accept based on size of the job, or more particularly the order quantity or value of the order. That is, due to cost factors, a customer will not place an order with a manufacturer for a small to medium sized piece quantity as the set up or make ready of the job makes the order cost prohibitive, even assuming that the manufacturer would accept the order if a particular price could be obtained to justify production.

The foregoing difficulty is largely based on conventional manufacturing techniques that normally utilize webs of material that are successively printed or otherwise treated in order to produce a finished product assembly. As such, small to medium sized runs of product are generally not adaptable to this type of manufacture due to the amount of material (length of a web) that must be used in order to prepare a particular job and manufacture the product in a cost effective manner.

Such conventional manufacturers have normally produced product runs that range in the hundreds of thousands to millions or even tens of millions of pieces for a single order. As such, the equipment that is used to produce this level or quantity of product is then set up to handle only large manufacturing runs. The apparatus used in this type of fulfillment will normally only operate efficiently in this higher range of production quantities and often cannot be reconfigured. Thus, even if a manufacturer wished to pursue smaller runs or orders sizes, the manufacturer is faced with the dilemma of making new capital expenditures to purchase equipment that specializes in this type of application not to mention having to retrain existing personnel or hire and train new employees to generate this type of production activity.

Another drawback facing conventional manufacturers of business communication products is that in addition to the possibility of retooling the production infrastructure, the producers may also need to seek out new sales channels and distributors for products that fall within the smaller production run niche as the conventional sales channels are likely still focusing on procuring orders for larger production runs.

A still further drawback of trying to migrate to smaller customer applications relates to quality of the pieces that need to be generated. With the focus of the market slowly shifting to smaller runs, the end user is now demanding a greater image quality than that typically associated with conventionally printed products. It is believed that the reason for such far reaching changes is that budgets for marketing and business communications have been cut back in recent years and as such, end users want more from each piece that is produced rather than relying on the quantity of pieces to generate the desired result.

Conventional processes that are used today, for example, in creating business communication pieces, such as prime labels and other pressure sensitive label configurations, are typically based on a continuous web technology that uses flexographic presses. The process includes the feeding of a continuous web of material, such as a preformed web of pressure sensitive laminate which normally consists of a top ply having a layer of adhesive on its underside that is covered by a release liner to form the laminate assembly through the press. The web is then processed through a press, typically a flexographic press, and an image is applied to the web by various stations. The web may then be collected, die-cut and the individual labels removed and applied.

Flexography is commonly used today for the printing of decorative items including the rendering of packaging and employs a series of plates and one or more stations, containing inks, to apply colored images to the web as the web traverses the press. Through improvements in ink qualities and other modifications and enhancements in the technology, the image quality in flexographic presses and resulting products has improved to about 150 lines per inch.

Typically, for a point of reference, screens that have rulings of about 60 to 100 lines per inch are normally used to make halftone printed images for newspapers. Screens with about 120 to 150 lines per inch are commonly used today to produce images for magazines and commercial printing. Such screens are regularly produced by electronic dot generation.

Electronic dot generation is normally performed by computers that use unique screening algorithms in cooperation with electronic scanners and image setters to produce halftone images that are to be subsequently used to render an image. The pixels of digitized images are first assembled into dots that are then used to form shapes, sizes, rulings, etc. which create the ultimate image produced on the substrate.

While flexographic technology or flexography is desirable for use in such printing due to the economies that can be achieved when compared with other types of printing processes, such as lithography, there are a number of drawbacks in utilizing this process for certain applications. Initially, the quality is limited, despite improvements in the technology to about 150 lines per inch. This can make some complicated graphics appear "grainy". Other images, such as those that use flesh tones or deep or rich colors, may look faded or "washed out". The effects of this level of image resolution can detract from the product appearance which may diminish the value of the technology and the products produced particularly for the prime label market. With increasing sophistication of consumers, as well as technology and expectations from each, such effects may be undesirable to potential end users.

Flexography also suffers from other drawbacks, such as the time that is involved in preparing a production job to run or "make ready" as it may otherwise be known in the industry. That is, the steps that are used to prepare the flexography equipment for running a particular job or order. This "make ready" process includes such activity as the preparation of multiple plates to produce the image at each station, mixing inks, calibration and alignment of the images between stations and the like. Operation of the flexography presses may also include multiple operators which can add to manufacturing costs. In addition, waste can also be a problem with such conventional printing technologies in that a number of feet, yards or meters of web material must be processed through the press in order to have the colors reach a predetermined threshold and to ensure appropriate registry of the stations as they are printing the images on the web. The amount of material wasted can be several times the length of the press or up to several hundred feet of material. The use of such volumes of materials obviously increases the cost of the operation. Thus, due to the make ready process and waste factors, the production of products (e.g. prime labels) through the use of flexography may then be limited to serving only certain market segments, namely large market segments. Markets that are applicable for this technology segment are generally believed to be those orders for large quantities of several hundred thousand or millions of pieces, which potentially leaves the smaller label market, e.g. 100 to 1,000,000 labels, unfulfilled or at least not adequately served by currently available technologies due to cost and materials thresholds.

Another drawback believed to be associated with flexographic technologies is that the technology cannot provide any variability in the product, including such basic functionality as sequential numbering, addressing or adding promotional text in connection with a seasonal advertisement or other offering without the addition of further processing stations. If such features are required by an end user or customer, such as with product date or coding, this function generally cannot be performed by flexographic presses without the inclusion of additional stations. Instead, these features typically must be achieved through an off line operation, such as ink jetting, often after the label has been applied to the container or carton. Alternatively, the ink jetting may be performed directly on the container as part of a separate operation.

Flexographic presses normally have a number of pre-determined stations. For example a four color press may have only four stations that can be used to treat or process the web. Thus, if other stations are to be added, such as a numbering head, the manufacturer likely then has to reduce the number of colors that can be added to the web as one station has been surrendered for the numbering head.

Flexographic technology also limits the ability to add personalization to products produced on such presses. This may be particularly desirable in certain market segments where such prime label products on consumer package goods ("CPG") may further enhance the product or service offering by making the product more attractive to prospective purchasers, thereby increasing the appeal to the consumer of the product or service.

Identifiers such as labels, business cards or tags may also be readily rendered using desktop equipment. While the resolution may be slightly improved when compared with conventional flexographic technology, speeds of application are significantly reduced as the images are processed in a sheet wise fashion on desktop equipment. This results in only a few sheets per minute being produced as opposed to hundreds of feet per minute that are commonly capable of being processed by flexographic equipment. That is, the desktop unit may only handle and print one sheet at a time before the next sheet is advanced for printing or imaging when compared with a conventional web fed process which produces sheets at a faster rate. Thus, in using such a desktop process one may only be able to render a handful of sheets per minute as opposed to a flexography operation that may process several hundred feet per minute. Use of desktop processes is thus not likely efficient in trying to generate hundreds and certainly not thousands of labels, but may be useful in creating a few dozen labels for very small applications such as a small home or small office environment.

What is needed, therefore, is a continuous production system by which high quality graphics provided in a sheet wise environment can be used to create products for a number of distinct applications in an endless manufacturing system. For example, graphics having a resolution in excess of about 150 lines per inch can be produced in an efficient and cost effective manner, such as in a continuous system operating at greater than fifty feet per minute. Moreover, a system which can add substantial variability to the product as well as other features, such as embossments, over laminates, variable printing or imaging and the like, would greatly expand the penetration of this form of business communication in the marketplace. The present invention seeks to provide a system for producing an intermediate assembly that is capable of having a number of different surface configurations, e.g. labels, cards, tags, plastics, films and the like. The surface configurations, which will consist of a series of discrete individual elements will each have printing or imaging that includes graphical or resolution quality of about 150 or more lines per inch and preferably more than 300 lines per inch, which is approximately equal to about 2500 to 3500 dots per inch ("DPI") in order to create a high quality image product that is intended to be aesthetically appealing to the consumer and to more effectively communicate the business message of the application.

BRIEF SUMMARY OF THE INVENTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

Surprisingly, it has been discovered that there is no readily available process or system by which a manufacturer can create high quality printed form product templates, in a continuous process with each of the templates or ribbons each having significantly improved graphic resolution that is greater than about 150 lines per inch, preferably greater than about 200 lines per inch and still more preferably about 300 lines per inch, in an efficient and cost effective manner.

Through the development of the present system and the creation of the unique intermediate web assembly described in this invention, the manufacturer can now service a particular niche market segment for creating high quality templates in a continuous fashion, such as those ranging from approximately 100 to 1,000,000 prime labels. While the foregoing market size or segment is a target area of the present invention, it should be appreciated that the invention may be practiced and used to fulfill larger order quantities, such as those of one million or more.

The pressure sensitive intermediate of the present invention is created through operation of a novel system that includes the pre-production of printed sheets which are then converted to roll, which provides savings specifically through reduced make ready time and generation of waste material. The present system thus yields a product having a higher image resolution when compared with conventional processes such as those produced by using conventional flexographic technologies.

The present invention uses a number of previously prepared individually created sheets, or segments, that have imaging or printing already applied to the sheets, e.g. graphical depictions, before the sheets are provided to the manufacturing press. The printing is provided in pre-defined areas, determined prior to production, to create individual segments that can be used for a number of purposes. The templates or segments are then cut from the sheet and supplied to a feeder mechanism. The templates, sheets, ribbons or segments are then applied to the web in a number of patterns, including substantially edge-to-edge configuration, with a slight overlap or alternatively, provided in regularly occurring increments depending on the needs of the particular application to be serviced.

In addition, the product produced in connection with the present process described in the instant application is also not limited in functionality as a number of materials, operations and options may be used in creating a relatively dynamic product. Such additional processes may include variable printing, embossments, coatings, over laminates and the like.

By preparing the intermediate prime label assembly in the manner described herein, the intermediate web can be processed continuously at speeds of greater than 50 feet per minute, preferably between 75-150 feet per minute and still more preferably at speeds of about 200 feet per minute or greater.

The system of the present invention can be used in the creation of a number of unique products such as webs that carry a series of labels, tags, cards, magnetic pieces, films and the like or mixtures of these elements. For example, a web can consist entirely of label segments or templates, or can have alternating and regular repeating arrangements of labels. Another element, such as cards may have complete variability such that multiple elements are laid down in a particular sequence (label, card, magnetic, etc.) on a web.

In one exemplary embodiment of the present invention, a system for producing a continuous pressure sensitive web assembly that has regularly occurring surface segments prepared in an endless process, is provided and includes a continuous supply of liner material that is coated with a pattern of pressure sensitive material from an adhesive applicator.

The liner material will preferably have a release coating applied to the surface prior to the application of the adhesive. The release coating is provided on the first face of the web such that when an adhesive is applied, the adhesive will transfer to the back of the segments or sheets when the individual segments are removed from the web. This will occur as the adhesive has a greater affinity for the segments or sheets than for the carrier web as the segments do not have a release coating applied to the surface in contact with the adhesive.

Continuing with a description of the presently described embodiment of the present invention, a high quality image rendering device is provided for producing printing or imaging on each sheet of printable stock. Each of the sheets of stock material are cut into individual ribbons, such as through the use of a die cutter to produce a number of individual ribbons with each ribbon containing an area that has a printed or imaged area and a matrix portion.

The present system uses a placer mechanism for depositing each of the ribbons on the adhesive coated web in a regularly occurring pattern in a continuous fashion. A matrix trimming apparatus is provided for severing the matrix portion from the printed or imaged area of the ribbon to create a pressure sensitive web that has a series of regularly occurring discrete imaged segments. The system also includes a rewinding station for collecting the web with the discrete imaged segments in a roll or continuous fashion.

It should however be appreciated that while the web is collected in a roll format, the web may later be cut into individual sheets, with each sheet containing at least one ribbon so as to create a pressure sensitive sheet assembly.

In a still further embodiment of the present invention, a system for creating an intermediate web assembly is described and includes a series of pre-printed or pre-imaged segments that are placed in a hopper assembly for holding the individual segments. An automated feeder assembly is used for receiving the supply of segments from the hopper and for feeding and depositing each of the segments sequentially on a surface of a continuously traveling web.

An intermediate web assembly is created by this system with the web having intermittently laminated segments that are disposed in a substantial edge-to-edge configuration on the surface of the web. An automated severing mechanism is provided and is used for severing each of the segments into a printed or imaged portion and a matrix portion.

The system also includes a take up assembly for removing the matrix portion from each of the segments and a receiving station for collecting the intermediate web assembly with the printed or imaged segments disposed in a regularly spaced configuration.

In a yet still further embodiment of the present invention, a system for producing an intermediate web assembly is provided and includes, an order entry platform for capturing information relating to individual print jobs and an image rendering device for printing discrete areas on sheets of material, with at least one area representing at least one print job.

A series of printable sheets are provided for use in the presently described system for receiving printing from the image rendering device. A continuous liner supply device is used for supplying a continuous web of liner material to a web handling apparatus. An adhesive application station is used to apply a pattern of adhesive to a surface of the web of liner material. A cutting device is also provided with this system for cutting each of the sheets after printing into individual segments with each of the segments containing printing relating to at least one job.

A placer mechanism is used for placing each of the individual segments in a sequential and continuous manner on the web of liner material to create an intermediate pressure sensitive web assembly that has a series of regularly occurring preprinted segments that are intermittently laminated to the web.

In each of the foregoing embodiments, the web of material may be supplied to the web handling apparatus through the use of a series of festooning accumulation rollers. In this manner, a continuous supply of web material may be introduced to the system as well as multiple webs and laminates.

The system of the present invention may be used to create shaped articles from the intermediate laminate assembly. The articles may be produced by die cutting, such as laser die cutting, and the shapes may be regular or irregular, animate, inanimate or geometric.

These and other objects of the invention will become clear from an inspection of the detailed description of the invention and from the appended claims.

BRIEF DESCRIPTION OF THE DRAWINGS

These, as well as other objects and advantages of this invention, will be more completely understood and appreciated by referring to the following more detailed description of the presently preferred exemplary embodiments of the invention in conjunction with the accompanying drawings, of which:

FIG. 3 provides a representation of an exemplary preprinted sheet showing the areas that will become the individual segments, once the segments are cut from the sheet of material;

FIG. 3A presents several individual segments that have been cut from the sheet shown in FIG. 3.

DETAILED DESCRIPTION OF THE INVENTION

Figure 1:
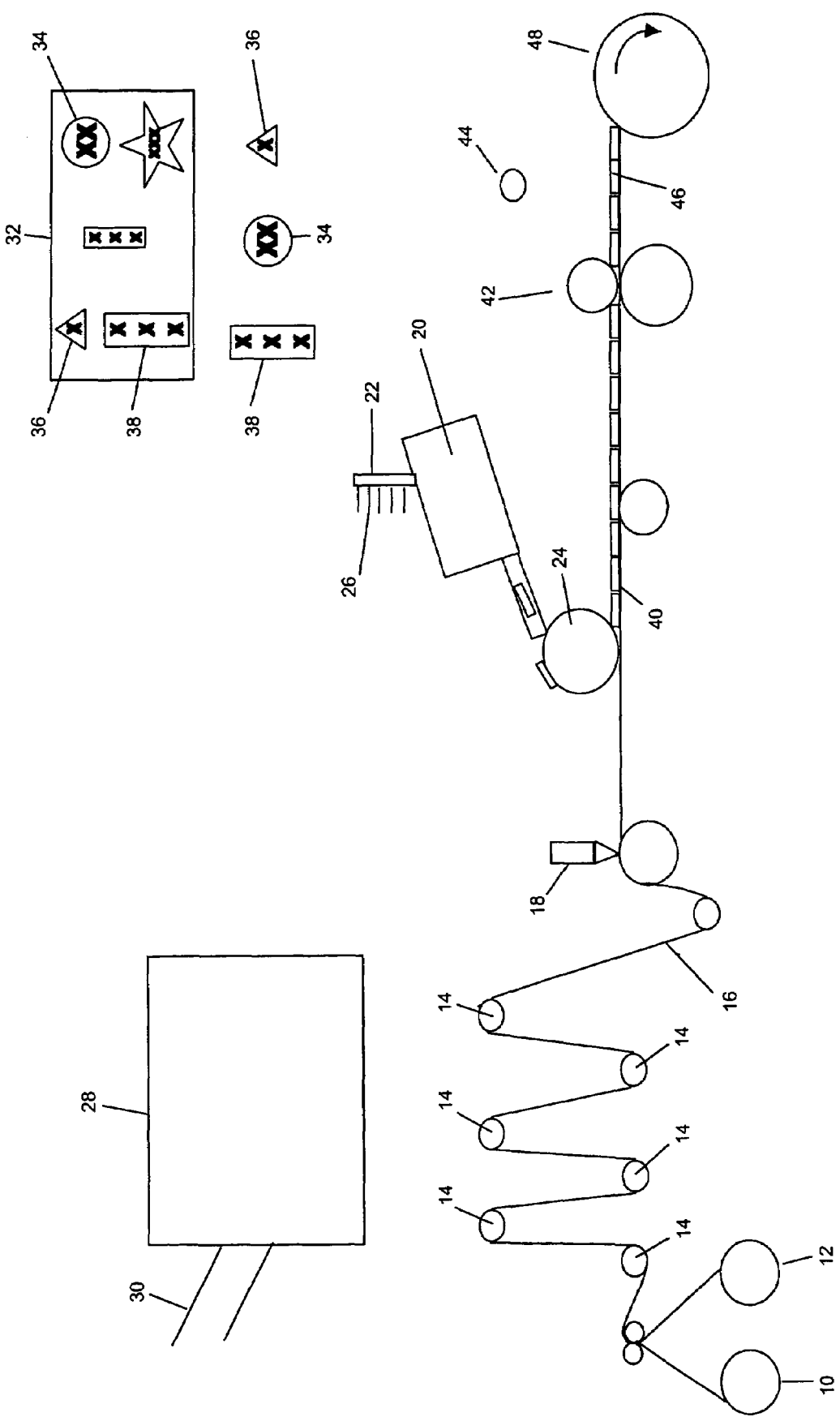
FIG. 1 depicts a schematic of the apparatus used in the system of the present invention.

The present invention is now illustrated in greater detail by way of the following detailed description which represents the best presently known mode of carrying out the invention. However, it should be understood that this description is not to be used to limit the present invention, but rather, is provided for the purpose of illustrating the general features of the invention.

The term "patterns" as used herein refers to strips, lines, shapes, spots, dots, elements and discontinuous segments, as well as regular and irregular placement of such items. Patterns may also refer to combinations of the above-mentioned items such that one pattern may be a continuous strip; another, segmented elements; and still further an irregular placement of elements or the like. Any combination of patterns is possible depending on the need or application of the manufacturer or the end user. In addition, the pattern can be prepared in order to accommodate a particular theme, season, event, trade dress, graphics, alpha and numeric characters, and the like. Patterns are used in connection with the present invention to describe the placement of the label segments or ribbons applied to the web or individual prime labels positioned on the web in a particular pattern or arrangement. Pattern, as defined herein, also is used in connection with the adhesive that is applied to the continuous web.

As used herein the term "business communication piece or document" refers to a substrate that, either alone or in combination with other documents can convey a particular message, image or provide information about a particular product or service that is available from the provider of such pieces or documents. Business communication documents or pieces can include advertising, sales and marketing collateral and such other items used to convey information on written or imaged form sheets, brochures, presentation folders, informational sheets and combinations thereof.

The term "personalized information" refers to information that is printed or imaged onto a substrate, which is generally variable or unique and which may change from document to document or segment to segment, so as to create a customized message or communication for each recipient. Examples of personalized information may include names, addresses, descriptions, plans, coding, numbering, promotional text, etc. that may have been acquired from the intended recipient through surveys, questionnaires or answers given to various inquiries generated in response to a request for goods or services.

The term "static or fixed" information refers to printed or imaged information that generally does not change from document to document or segment to segment and may include a general description or body of information about particular products, services, places, etc. that may be of interest to the intended recipient and represents a standard message that the manufacturer or supplier wishes to convey to an end user or customer of the offering.

The term "intermediate" as used herein, refers to a product that undergoes one or more processing steps prior to the intermediate reaching a final condition, that of being ready for end use or application. The additional processing steps may include printing, imaging, folding, sealing, separating, cutting, perforating, scoring, adhering and the like. Typically, a product, such as with the present invention, is provided in an intermediate condition so that a user can add or manipulate the intermediate to create the final or desired end product, such as applying the prime label to a container, carton or the like. Thus, in accordance with the present invention, the intermediate segment, for example, could be subject to die cutting or additional printing, such as through ink jetting, over laminating, coating or embossment, and then applied to a container, carton, consumer package good or the like.

The term "sheets" or "segments" as used herein, refers to sheets, segments, ribbons, strips, pieces, parts, sections, subdivisions and combinations thereof. The sheet or segment provided as an example for the purposes of this specification can be an entire sheet such as 8½"×11", 11"×14", 19"×25" and other known sheet sizes or may be segments, divisions, strips, etc. of such sheets. For example, a 19"×25" sheet may be produced with five rows of labels, with each row having six labels, with each label having dimensions of approximately 3"×4". For instance, in this example, each row may comprise an individual segment or sheet that may be used in practicing the present invention. It should, however, be understood that the invention is not to be so limited to the foregoing configuration that individual pieces or elements, regardless whether the piece or elements have a regular or irregular shape, may be used in connection with this process to produce the intermediate assembly that is described in this application.

As used herein, the term "templates" or "element" refers to a particular size, configuration or arrangement of a piece. For example, if the template or segment is a label, the label may have a size of 2"×4", 1"×2" and other sizes that may be customarily produced. Likewise, if the piece is a card, the card may have a size ranging from 3"×5", 2"×4" or any other suitably sized card. The term templates can be used to refer to segments, ribbons and similar terms.

Through use of the present invention, a vast array of identifiers, e.g. labels, tags, cards, plates, magnets, etc. can be placed on an adhesive coated web and then collected for later use, thereby creating a versatile pressure sensitive intermediate web assembly. Through the use of the unique process presented herein, a manufacturer may create innumerable high quality graphics, illustrations and variable and personalized text and indicia to create a greater impact on the potential consumer or end user. The invention provides a number of unique benefits when compared with conventional technologies in that the process can occur at roughly equivalent press speeds and may be handled by conventional applicators.

Reference is now directed to FIG. 1 of the present invention which provides a schematic drawing of the system utilized in creating the pressure sensitive intermediate laminate assembly. The system includes one or more supplies of liner material 10 and 12 which supply, for example, a release coated, paper liner stock to the web handling apparatus. The continuous supply of material will be processed through a series of festooning rollers each represented by 14 that accumulate the web material prior to processing of the web through the system. Use of such an accumulation assembly will enable an endless supply of material to be run through the system without having to shut down operations to change over web supplies.

The web 16 is initially passed though an adhesive applicator 18 which applies a pattern of adhesive to the web. As mentioned previously, it is preferable that the web is provided with a release coating so that the adhesive will readily transfer to the underside of the ribbons or segments, once the ribbons or segments are peeled from the laminate assembly.

Next, the web is passed beneath a placer mechanism 20 which is used to take individual segments that are placed in a hopper 22 and position the segments on a web such as through the use of a roller assembly 24. An exemplary placer, feeder or insertion device is a Maverick® available from In-Line Automation of Minneapolis, Minn.

The segments or ribbons 26 are initially prepared through the use of a high quality imaging device 28 which is provided with a series of suitable stock material in sheet form 30. Examples of image generating devices include high resolution imaging devices such as Indigo®, available from Hewlett Packard of Palo Alto, Calif. or Karat available from KBA of Williston, VT. Ideally, the present invention seeks to provide a segment or intermediate with a series of segments that has a quality of about 150 or more lines per inch and preferably more than 300 lines per inch, which is approximately equal to about 2500 to 3500 dots per inch ("DPI") in order to create a high quality image that is intended to be aesthetically appealing to the consumer.

The sheet stock 30 is printed 32 in predetermined areas as represented by individual segments or ribbons 34, 36 and 38. The ribbons or segments are then severed from the sheet by a suitable cutting mechanism (not shown) such as by a laser die cutter, mechanical die cutter, guillotine or other mechanism. Each of the individual segments is then inserted into the hopper 22.

Prior to insertion, if multiple jobs or orders are being run, the segments or ribbons may be sorted by job or order so that when the segments or ribbons are placed into the hopper, each segment or ribbon relating to the order or job will be adjacent one another so that all of the segments for a particular order will be placed in the same area on the web. Alternatively, the segments can be placed in any other sort of order, such as by shape or simply loaded in a random arrangement whereby if different orders are run during a particular manufacturing run, the segments or ribbons relating to each of the different orders will subsequently be separated.

Once the segments are placed on the web, as represented by numeral 40, the laminated web assembly will enter a cutting station, such as a laser die cutter, represented by reference numeral 42, wherein the printed area of the segment will be separated from the matrix or unprinted area of the segment and the matrix collected at 44. The individual die cut segments 46 are then collected by a rewinding system 48, such as a turret rewinder 48.

Figure 2:
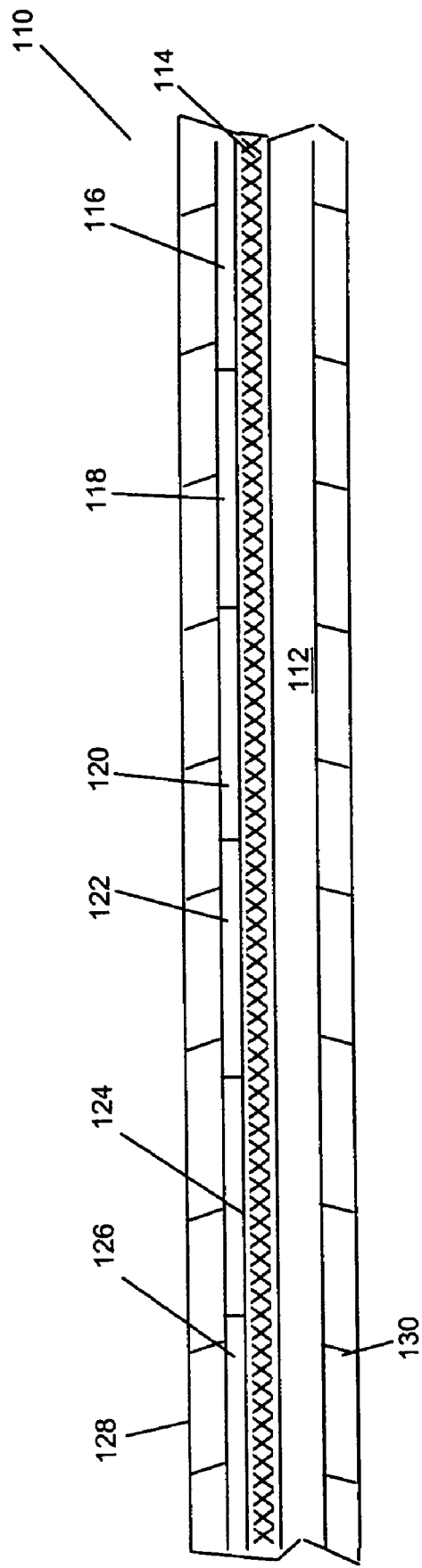
FIG. 2 shows a cross sectional view of the pressure sensitive laminate assembly prepared in connection with the present invention.

Attention is now directed to FIG. 2 of the presently described embodiment. The pressure sensitive laminate assembly is generally depicted by reference to numeral 110. The assembly 110 preferably includes a continuous web 112. The web 112 will have first and second faces, and first and second longitudinally extending sides. The web 112 will also have first and second transversely extending ends which will naturally occur at the beginning and end of the roll of material. If the web is provided in a sheet configuration, then obviously, the ends will appear at the ends or edges of the sheet of material.

A pattern of adhesive 114 is applied over the top of the web of material 112 and preferably will be a permanent adhesive so that when the individual segments are applied, the segments will be permanently affixed to the surface of the web. Other adhesives are of course useable in connection with the practice of the present invention, including removable, repositionable and heat seal type adhesives.

A series of discrete, individual segments or ribbons 116, 118, 120, 122, 124 and 126 are applied over the top of the adhesive. The segments will each have first and second longitudinally extending sides, first and second transversely extending edges and top and bottom faces. The segments are cut from a sheet (see FIG. 3) which is preprinted with graphics, indicia or combinations thereof in the area that will become the segments.

FIG. 2 is also used to indicate the application of a synthetic film 128 and 130 that has been applied over the top and bottom of the assembly 110 after the segments have been applied to the web 112. The films are intended to provide additional protection and complete the final lamination of the assembly when they are used.

FIG. 3 provides an exemplary representation of a sheet of material 50 that is used in the preparation of the individual segments. Sheet 50 is preferably selected from any suitable printable sheet material and may include cellulosic based stock, films, foils, synthetic materials and the like. The sheet has first and second longitudinally extending sides 50$a$ and 50$b$ and first and second transversely extending ends 50$c$ and 50$d$.

The sheet depicted in FIG. 3 will be preferably printed in a number of pre-determined discrete, individual areas represented by numerals 52, 54 and 56. As can be seen, the segments represented in the drawing have regular and irregular shapes and the invention is not limited by the type or shape of segment that can be printed and then cut from the sheet. Shapes, such as geometric, animate and inanimate may be prepared and utilized in the practice of the present invention. The areas 52, 54 and 56 that will make up the segments that are to be applied to the web are pre-printed with text and graphical depictions which may include variable and/or personalized printing, static or fixed informational printing and combinations thereof. In addition, the graphics and textual depictions may vary from one segment area to the next or be the same throughout the entire sheet or any sort of combinations thereof.

As can be seen from the drawing FIG. 3, each of the segments has a dimension (length and width) that is smaller than the dimension (length and width) of the sheet from which they are cut. In this manner, a number of segments may be printed while in the sheet configuration, thereby reducing the amount of waste material that needs to be trimmed away from the segments after cutting.

FIG. 3A shows a number of the segments after they have been cut from the sheet depicted in FIG. 3. Segments 52a, 54a and 56a are each presented with printing and graphics. The segments are further shown in a relational theme (in the present example, reference to a pizza establishment) to one another representing the diversity of print jobs and elements that can be created through practice of the present invention.

Figure 4:
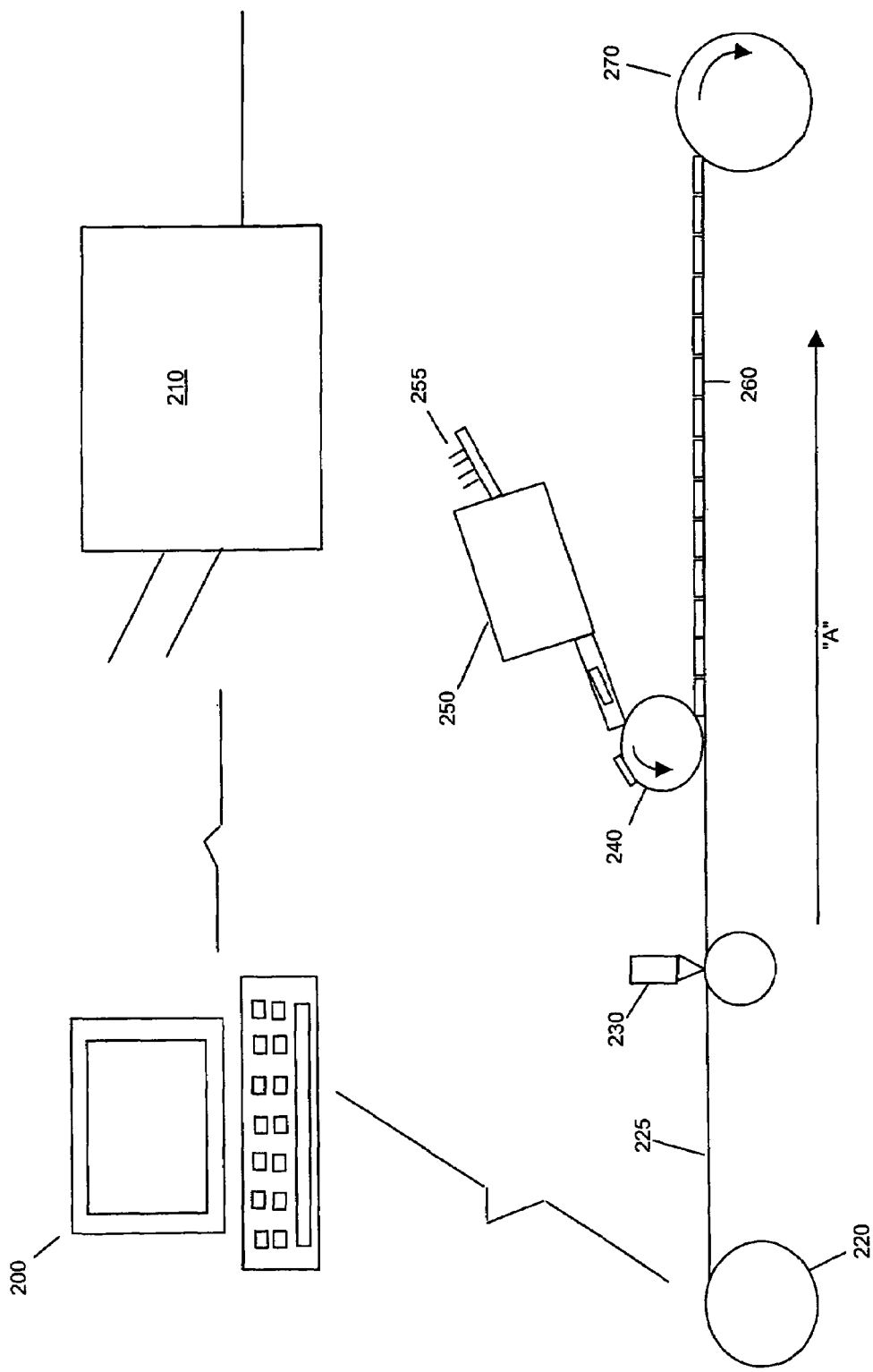
FIG. 4 illustrates a further schematic of the system used in the practice of the present invention.

FIG. 4 represents a further schematic of the system used in the present invention and includes an order entry platform 200, such as a computer that is connected to an image generating device 210 and a web handling apparatus 220. The order entry platform 200 may be connected via a local area network, wide area network or global communications network. The computer will be provided software programs that will capture information relating to the order to be produced as well as undertake other "pre-flight" activities such as clean up of the graphics is conducted, so that the image will appear crisp, the textual portions are checked for errors and the printing area and size of the product is determined for positioning.

A continuous web of material 225 is handled by the web apparatus 220 and advances in a machine direction "A" through an adhesive application station 230 which applies a pattern of pressure sensitive adhesive to the web of material 225. The adhesive coated web is then advanced to a segment application station 240 which includes a roller or other exemplary placing mechanism that is fed segments from a hopper 255 connected to a feeder device 250. The segments are applied to the web in an intermittent and continuous fashion, with each segment being handled by the feeder 250 and placer 240 individually. The web now with segments applied 260 is then advanced to a take up or collection area 270.

It will thus be seen according to the present invention a highly advantageous system for producing a continuous intermediate pressure sensitive web assembly having regularly occurring segments has been provided. While the invention has been described in connection with what is presently considered to be the most practical and preferred embodiment, it will be apparent to those of ordinary skill in the art that the invention is not to be limited to the disclosed embodiment, that many modifications and equivalent arrangements may be made thereof within the scope of the invention, which scope is to be accorded the broadest interpretation of the appended claims so as to encompass all equivalent structures and products.

The inventors hereby state their intent to rely on the Doctrine of Equivalents to determine and assess the reasonably fair scope of their invention as it pertains to any apparatus, system, method or article not materially departing from but outside the literal scope of the invention as set out in the following claims.

The invention claimed is:

1. A method of producing a continuous web prime label intermediate for use in product labeling machines, comprising the steps of:
   a) providing a continuous moving carrier web carrying a continuous release liner;
   b) coating a pattern of adhesive onto said liner;
   c) providing a supply of printable sheets;
   d) printing on each of said sheets a plurality of prime label graphical indicia arranged in the form of strips containing label portions and matrix portions;
   e) cutting said sheet to separate said strips from each other;
   f) placing said strips end to end on said pattern of adhesive in such a manner that a repetitive sequence of different label portions from said sheet is sequentially placed on said coated liner in a predetermined order;
   g) severing said label portions from said matrix portions without cutting said web;
   h) removing said matrix portions from said web; and
   i) rolling up said web carrying said label portions.

2. The method of claim 1, in which said strips are elongated and are selectively placed parallel and/or transversely to the direction of motion of said web.

* * * * *